(12) United States Patent
Freckleton et al.

(10) Patent No.: US 12,105,778 B2
(45) Date of Patent: Oct. 1, 2024

(54) REAL-TIME VIABLE USER DETERMINATION

(71) Applicant: T-MOBILE USA, INC., Bellevue, WA (US)

(72) Inventors: Mark Freckleton, Silverdale, WA (US); Claire Jennings, Kirkland, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 401 days.

(21) Appl. No.: 17/460,636

(22) Filed: Aug. 30, 2021

(65) Prior Publication Data

US 2022/0107998 A1    Apr. 7, 2022

Related U.S. Application Data

(60) Provisional application No. 63/087,070, filed on Oct. 2, 2020.

(51) Int. Cl.
| | |
|---|---|
| *G06F 21/31* | (2013.01) |
| *G01C 19/00* | (2013.01) |
| *G01P 15/00* | (2006.01) |
| *G06F 21/34* | (2013.01) |
| *H04L 9/40* | (2022.01) |
| *G06N 20/00* | (2019.01) |
| *G06Q 30/0201* | (2023.01) |

(52) U.S. Cl.
CPC .......... *G06F 21/316* (2013.01); *G01C 19/00* (2013.01); *G01P 15/00* (2013.01); *G06F 21/34* (2013.01); *H04L 63/08* (2013.01); *G06N 20/00* (2019.01); *G06Q 30/0201* (2013.01)

(58) Field of Classification Search
CPC ........ G06F 21/316; G06F 21/34; G06F 21/32; G01C 19/00; G01P 15/00; H04L 63/08; H04L 2463/082; G06N 20/00; G06Q 30/0201
USPC .......................................................... 726/19
See application file for complete search history.

(56) References Cited

U.S. PATENT DOCUMENTS

| | | | |
|---|---|---|---|
| 9,563,852 B1* | 2/2017 | Wiles ................... | A01B 79/005 |
| 10,755,095 B1* | 8/2020 | Cunningham ..... | G06Q 30/0185 |
| 2013/0185429 A1* | 7/2013 | Yuan ..................... | G06Q 30/02 |
| | | | 709/225 |
| 2014/0137191 A1* | 5/2014 | Goldsmith .............. | H04L 63/08 |
| | | | 726/3 |
| 2014/0157401 A1* | 6/2014 | Alameh .................. | G06F 21/32 |
| | | | 726/17 |
| 2016/0125308 A1* | 5/2016 | Bohne .................. | G06V 10/764 |
| | | | 706/12 |
| 2016/0210450 A1* | 7/2016 | Su ......................... | G06F 21/552 |

(Continued)

*Primary Examiner* — Jacob Lipman

(57) ABSTRACT

Described herein are techniques for providing identification of a current user of a user device. Such techniques may comprise receiving a request for identification of a current user of a user device, receiving interaction data that includes information about current usage patterns for the user device, retrieving profile data associated with at least one potential user of the user device, comparing the profile data to the information about current usage patterns to determine for the at least one potential user of the user device, a likelihood value that the at least one potential user is the current user of the user device, and providing the determined likelihood value in response to the received request.

19 Claims, 5 Drawing Sheets

(56) References Cited

U.S. PATENT DOCUMENTS

| | | | |
|---|---|---|---|
| 2018/0068098 A1* | 3/2018 | Finzi | H04W 12/068 |
| 2018/0232805 A1* | 8/2018 | Chen | G06N 20/00 |
| 2019/0227912 A1* | 7/2019 | Banuelos | G06N 20/00 |
| 2019/0354636 A1* | 11/2019 | Hershowitz | G06F 16/838 |
| 2021/0158805 A1* | 5/2021 | Sivasubramanian | G06F 40/279 |
| 2021/0275023 A1* | 9/2021 | Kalantarian | G16H 50/30 |
| 2021/0337282 A1* | 10/2021 | Chhabra | H04N 21/47217 |
| 2021/0342426 A1* | 11/2021 | Pham | G06F 21/316 |

\* cited by examiner

REAL-TIME VIABLE USER DETERMINATION

CROSS-REFERENCE TO RELATED PATENT APPLICATION

This application is a nonprovisional of U.S. Provisional Application No. 63/087,070 filed Oct. 2, 2020, and titled "REAL-TIME VIABLE USER DETERMINATION," which is hereby incorporated by reference in its entirety as if fully set forth herein.

BACKGROUND

Many facets of our daily lives require user authentication. Among those facets are a number of systems, both hardware and software, that allow us to go about our daily lives. However, as fraud becomes increasingly sophisticated, conventional authentication techniques have become increasingly insufficient. When authenticating users, systems must often choose between providing convenience to users or providing more robust security. These two options often conflict, as providing one may prevent the system from providing the other.

SUMMARY

Techniques are described herein for providing identification of a user of a user device. In such techniques, interaction data that includes usage data for a user device is collected (e.g., via sensors installed on the user device). That interaction data is then compared to profile information that includes data about usage patterns for one or more users in order to determine a likelihood that a current operator of the user device is a particular user.

In some embodiments, identification data may be requested by one or more third-party applications or service providers from an application executed on a user device. The application executed on the user device may determine likelihood values for a number of users and provide those likelihood values to the one or more third-party applications or service providers. The one or more third-party applications or service providers may then implement authentication policies based on the provided likelihood values. For example, the one or more third-party applications or service providers may then determine whether to require additional authentication data from a current user of the user device based on the provided likelihood value.

In one embodiment, a method is disclosed as being performed by a lead vehicle in communication with a platooning platform, the method comprising receiving a request for identification of a current user of a user device, receiving interaction data that includes information about current usage patterns for the user device, retrieving profile data associated with at least one potential user of the user device, comparing the profile data to the information about current usage patterns to determine for the at least one potential user of the user device, a likelihood value that the potential user is the current user of the user device, and providing the determined likelihood value in response to the received request.

An embodiment is directed to a computing device comprising: a processor; and a memory including instructions that, when executed with the processor, cause the computing device to receive a request for identification of a current user of a user device, receive interaction data that includes information about current usage patterns for the user device, retrieve profile data associated with at least one potential user of the user device, compare the profile data to the information about current usage patterns to determine for the at least one potential user of the user device, a likelihood value that the potential user is the current user of the user device, and provide the determined likelihood value in response to the received request.

An embodiment is directed to a non-transitory computer-readable media collectively storing computer-executable instructions that upon execution cause one or more computing devices to perform acts comprising receiving a request for identification of a current user of a user device, receiving interaction data that includes information about current usage patterns for the user device, retrieving profile data associated with at least one potential user of the user device, comparing the profile data to the information about current usage patterns to determine for the at least one potential user of the user device, a likelihood value that the potential user is the current user of the user device, and providing the determined likelihood value in response to the received request.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
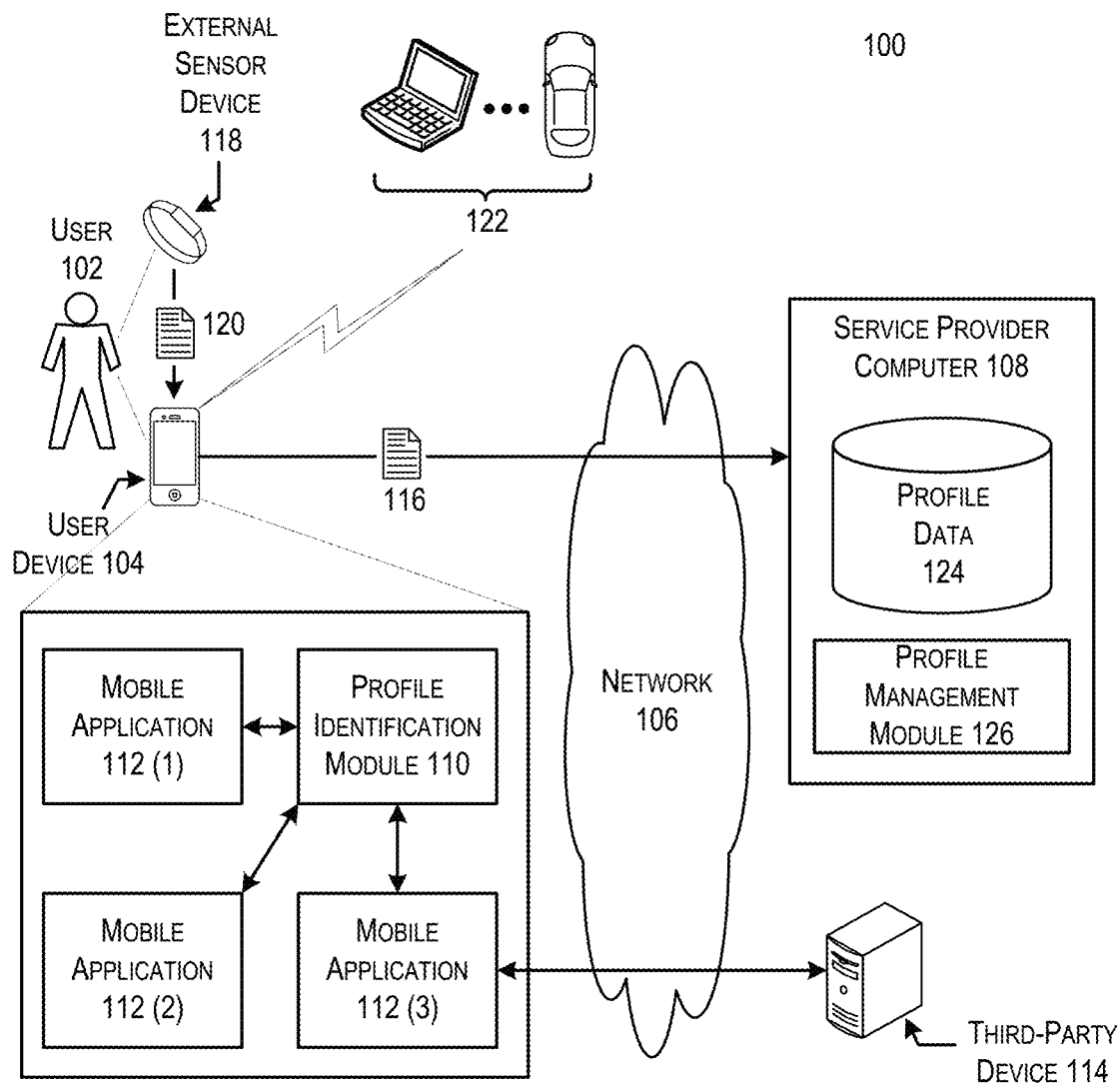
FIG. 1 depicts an illustrative system 100 that may be implemented in accordance with various embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques for providing user identity determination based on interactions between the user and a user device. In some embodiments, such techniques may provide a likelihood value that a user currently using a user device is one associated with a particular profile. In some embodiments, the techniques may be used to determine which, if any, of a set of typical users are most likely currently using a particular user device.

In the techniques described herein, user interaction data is collected in relation to events during which a user is in possession of a user device. In these techniques, determinations are made based on the interaction data and compiled into a profile for a user. Such a profile may include information about how a user interacts with each of a number of different types of user devices. When a request is received for a likelihood value for a user (e.g., from an entity wishing to conduct an authentication process), current user interaction data is compared to user interaction data stored in relation to one or more user profiles to determine a degree to which the current user interactions align with those in the user profile. A likelihood value is generated to represent a likelihood that a current user of the user device is a user associated with a particular user profile. In some embodiments, authentication processes may be supplemented based on the likelihood value. For example, if the determined likelihood value is not greater than some predetermined threshold, then an authentication process may be supplemented by adding additional requirements and/or steps.

Embodiments of the disclosure provide several advantages over conventional systems. For example, embodiments of the system described herein enable third-party applications and service providers to implement more intuitive authentication processes. Such authentication processes may enable the ability to determine conditions under which additional authentication processes should be implemented. This allows the third-party applications to better determine whether to implement additional security measures potentially at the cost of user convenience.

Additionally, some embodiments of the disclosure enable the ability of a user to maintain better control over authentication processes implemented on websites that use session tokens. Such embodiments enable such control without requiring active participation on behalf of an operator of the website. Using embodiments as described herein, users can dictate under what conditions session tokens can be used to automate login to a website.

FIG. 1 depicts an illustrative system 100 that may be implemented in accordance with various embodiments of the disclosure. As will be appreciated, although a single type of environment is used for purposes of explanation, different environments may be used, as appropriate, to implement various embodiments. The illustrative system 100 includes a user device 104 that is operable by a user 102 to send and receive data over a network 106 to a service provider computer 108. The user device 104 may have installed upon it a profile identification module 110 that performs at least a portion of the functionality described herein and that facilitates communication with the service provider computer 108. Additionally, the user device 104 may have installed upon it a number of mobile applications, such as mobile applications 112 (1-3), that interact with the profile identification module 110 in order to obtain user profile identification services as described herein. Each of the mobile applications 112 (1-3) may be associated with a third-party service that is supported by a separate remote third-party device 114. In some embodiments, the service provider computer 108 may be in communication with one or more third-party device 114 (e.g., via a connection over network 106). The user device 104 may be configured to transmit profile and/or user interaction data 116 to the service provider computer 108.

In some embodiments, the user device 104 may be in communication with one or more proximate external sensor devices 118 capable of obtaining data about the user and/or an environment in which the user device 104 is located. Examples of such an external sensor device 118 may include an exercise band, earpiece and/or external microphone, or other suitable device having one or more sensors. The external sensor device 118 may be in communication with the user device via a wired connection or via a short-range wireless communication channel (e.g., Bluetooth® or WiFi). In embodiments in which an external sensor device 118 are involved, the external sensor device 118 may transmit sensor data 120 collected via one or more sensors to the user device 104.

In some embodiments, the user device 104 may be capable of communication with one or more additional electronic devices 122. In these embodiments, the profile identification module 110 installed upon the user device 104 may provide user-identifying information to the one or more additional electronic devices 122 in order to lock or unlock functionality of that device.

The user device 104 can include any suitable electronic device operable to send and receive requests, messages or information over an appropriate network 106 and convey information back to a user of the device 104. Examples of such user devices include personal computers, cell phones, handheld messaging devices, laptop computers, set-top boxes, personal data assistants, electronic book readers and the like.

The network 106 can include any appropriate network, including an intranet, the Internet, a cellular network, a local area network or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof.

The service provider computer 108 can include any computing device configured to perform at least a portion of the operations described herein. Service provider computer 108 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Service provider computer 108 can include one or more virtual machines running virtual operating systems, or other computing architectures involving virtualization such as one or more flexible pools of logical storage devices that can be virtualized to maintain virtual storage devices for the computer.

In accordance with at least some embodiments, the service provider computer 108 may provide backend support for the profile identification module 110 of the user device 104. In some embodiments, the service provider 108 may maintain one or more software modules as well as data repositories. For example, the service provider may maintain profile data 124 that includes information about a user's interactions with one or more user device. Profile data may include any suitable indication of a user's typical behavior. For example, profile data may include an indication of a manner in which a user typically interacts with his or her user devices. The service provider may distribute profile data to one or more user devices operated by a user. The service provider may also include a profile management module 126 that provides backend support for the profile identification module 110 in determining a likelihood value that a current user of a device is associated with a particular profile.

Various interactions may occur between the described components of the system 100. In the system 100, a user 102 may interact with the user device 104 in his or her typical fashion. For example, the user may execute and interact with one of the mobile applications 112 (1-3) in order to access various functionality of the user device. In some cases, this may involve interactions by the user in which the user holds the user device, types upon, or makes gestures using the user device, walks or runs while in possession of the user device, or otherwise performs an action while in the possession of the user device. Various details of the performed action may be detected via one or more sensors installed on the user device 104. For example, as the user holds the user device, one or more gyroscopic sensors within the user device may obtain information on hold the user device is being held (e.g., at which angle, etc.). In another example, as the user types on the user device, a keystroke tracking function of the user device may record information on a speed at which a user types. In yet another example, as the user walks or runs, various sensors in the user device, such as an accelerometer, a geolocation sensor, etc., may record a gait and/or speed of the user. Information collected about the activities of the user (e.g., gait, typing speed, voice, etc.) may then be compiled into a profile for that user.

In some embodiments, the profile identification module 110 may be configured to collect information about various interactions between the user 102 and the user device 104 and to determine a likelihood value of the user matching a particular profile. In some embodiments the profile identification module 110 may be configured to determine which user profile, of multiple user profiles, is most likely the profile associated with the current user operating the user device based on information collected by the user device over a recent period of time.

In some embodiments, the profile identification module 110 is configured to compare user interactions with the user device 104 detected within a recent period of time with interaction data stored in relation to a user profile and to output a percentage or other representation of a likelihood value of a user being the one associated with a particular profile to another software application or electronic device 122. For example, a mobile application 112 may comprise a software application that provides functionality for a user based on an account maintained for the user. In this example, the mobile application 112 may require that a user be authenticated in order to access the account (e.g., log in). When authenticating the user, the mobile application 112 may interact with the profile identification module 110 (e.g., via an application programming interface (API) associated with the profile identification module 110) to obtain a likelihood value that the user is the one authorized to log into the account. In this example, upon receiving a likelihood value of the user being the user associated with the account, the mobile application 112 may adjust an authentication process based on the likelihood value provided by the profile identification module 110. In this example, if the likelihood value of the user being the authorized user is greater than some threshold, then the mobile application may authenticate the user by requiring the user to provide a password. However, if the likelihood value of the user being the authorized user is less than that threshold, then the mobile application may require the user to perform additional actions, such as answering additional security questions.

In some embodiments, the profile identification module 110 may enable a user device to authenticate a user to another electronic device 122. For example, the user device 104 may establish a communication session with one or more additional electronic devices 122. In this example, the profile identification module 110 may identify a user profile capable of accessing one or more functions of the electronic device 122 as well as a likelihood value that the current user is the one associated with the identified profile. In some cases, the profile identification module 110 may convey to the electronic device 122 a likelihood value that the user is associated with the profile. In some cases, the profile identification module 110 may convey an indication of a profile associated with a current user of the user device to an authentication application on the electronic device 122, which may then authenticate the user.

As noted above, the service provider 108 may receive profile and/or user interaction data 116 from the user device 104. In some embodiments, the profile and/or user interaction data 116 may be compiled into profile data 124. In some embodiments, the profile data 124 may include user interaction data received from a variety of different types of user device 104. In these embodiments, portions of the profile data 124 stored in relation to a user may be attributed to particular types of user devices such that the profile data 124 includes user information regarding the user's typical interactions with a variety of types of user device. In some embodiments, user interaction data stored in the profile data 124 may be used to train a machine learning algorithm in order to generate a trained machine learning model. A trained machine learning model generated in this fashion may be used to determine whether interactions between a user and a user device are typical of that user. Such a trained machine learning model may output a likelihood value that a set of received interactions can be attributed to the user.

The illustrative system includes a service provider computer 108. However, it should be understood that a service provider computer 108 can be several computers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The service provider computer can include any appropriate hardware and software for integrating with the data store as needed to execute aspects of one or more applications for the user device, handling a majority of the data access and business logic for an application installed upon (and executed from) the user device. The service provider computer provides access control services in cooperation with the data store and is able to generate content such as text, graphics, audio and/or video to be transferred to the user device, which may be served to the user in the form of HyperText Markup Language ("HTML"), Extensible Markup Language ("XML") or another appropriate structured language in this example.

The system may include a user device that may access the network through an access network via a wireless connection known as the air interface. The air interface may include cellular division multiple access (CDMA), time division multiple access (TDMA), frequency division (FDMA) and future iterations of cellular division, time division and frequency division wireless communications techniques. Examples include orthogonal frequency division multiple access techniques used in current versions of the air interface.

The network side of the air interface terminates with an antenna on a base station which operates as a local smart router. Base stations then access a core network over wired connection known as backhaul. Backhaul is often comprised of fiber optic communications cables. Because multiple antennas and base stations act as collectors funneling user equipment signals to the core network, i.e., providing access to the core network, this portion of the network is known as the access network.

The core network is the portion of the network where routing, billing, policy implementation and other communications services are implemented. Routing may be performed by core network servers such as a Serving GPRS Serving Node (SGSN) and a Gateway GPRS Serving Node (GGSN) for 3G and by Proxy-Call State Control Function (P-CSCF), Serving-Call State Call Function (S-CSCF) and Interrogating-Call State Control Function (I-CSCF) functions for IMS. Service application servers, also known as enterprise information technology (EIT) servers, implement application servers. Services are sometimes accessed via the Internet. A gateway provides an interface of the core network to the Internet.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
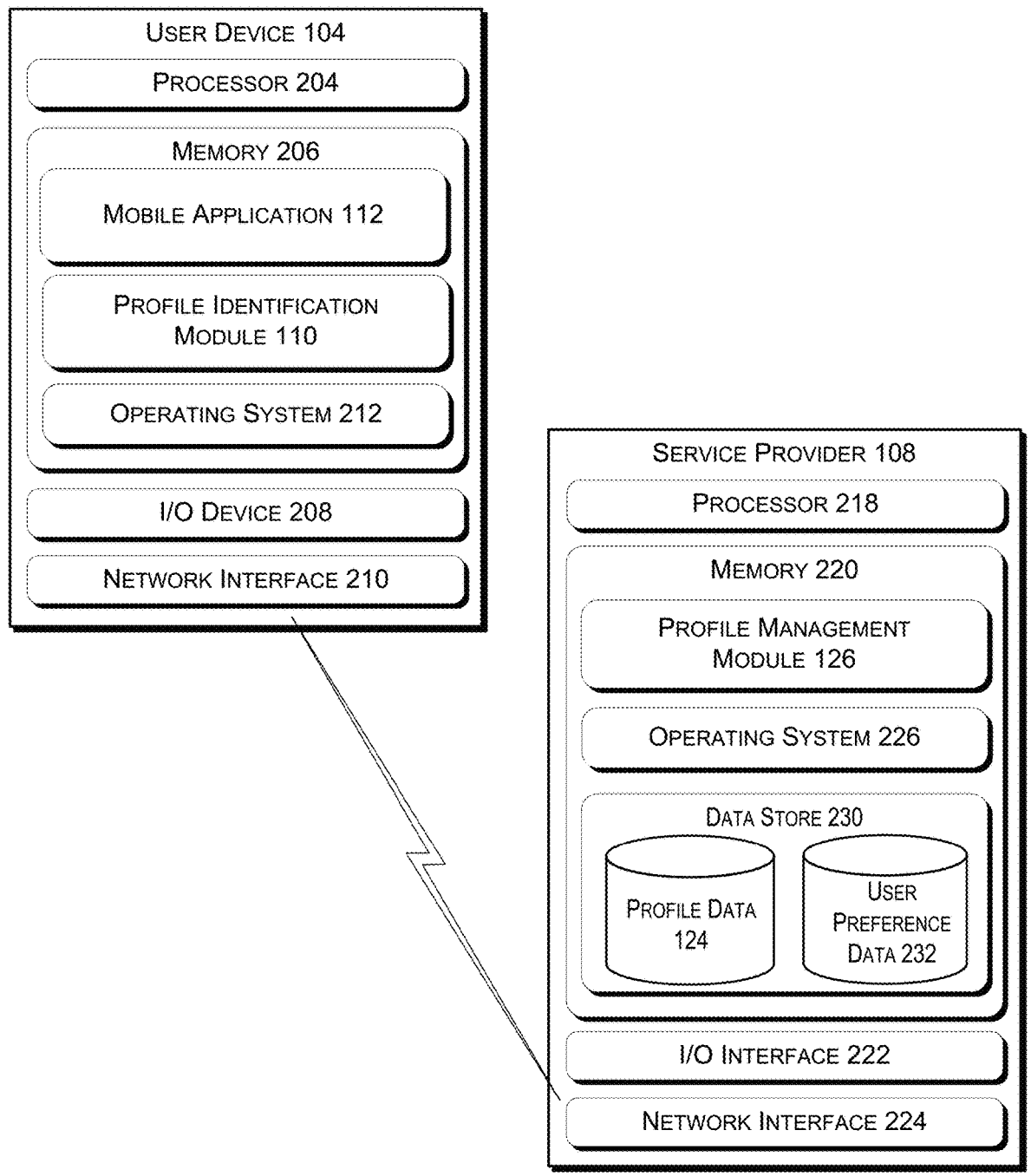
FIG. 2 depicts an exemplary general computing environment for providing user profile identification determinations based on user interaction data in accordance with some embodiments.

FIG. 2 depicts an exemplary general computing environment for providing user profile identification determinations based on user interaction data in accordance with some embodiments. Functionality for elements of a communication network and user devices for the techniques described herein are generally hosted on computing devices. The user device 104 in FIG. 2 may be an example of the user device 104 of FIG. 1 in communication with a communication network (e.g., network 106 of FIG. 1). In some embodiments, additional electronic devices (such as additional electronic devices 122 of FIG. 1) may be included in the computing environment.

The user device 104 may include a processor 204 and a computer readable memory 206. The processor 204 may be a central processing unit, and/or a dedicated controller such as a microcontroller. The user device 104 may further include an input/output (I/O) device 208, and/or a network interface 210. The I/O device 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O device 208 and may be a network interface card supporting Ethernet and/or Wi-Fi and/or any number of other physical and/or datalink protocols. Generally, the network will include a communication network. Accordingly, the network interface 210 will include a cellular radio and radio access software layer.

The one or more processors 204 and the memory 206 may implement functionality from one or more software modules and data stores. Such software modules may include routines, program instructions, objects, and/or data structures that are executed by the processors 204 to perform particular tasks or implement particular data types. The memory 206 may include at least an operating system 212 and a module for determining a likelihood value that a current operator of the user device is a particular user (e.g., profile identification module 110) as well as one or more mobile applications 112 that may be executed upon the user device.

Applications such as profile identification module 110 and operating system 212 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a runtime such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanisms. As defined herein, computer readable storage media may be "non-transitory" in that it does not consist of, and is not formed exclusively by, modulated data signals, such as a carrier wave. The user device 104 may also be equipped with various hardware. The hardware may include additional user interface, data communication, data storage hardware, or sensors (e.g., a camera, a gyroscope, an accelerometer, a compass, etc.). For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The profile identification module 110 may be configured to, in conjunction with the processor 204, determine a likelihood value that a current user of a user device correlates to a particular user profile. In some embodiments, profile information for one or more users may be stored on the user device. Such profile information may include an indication of a baseline of typical user actions/user propensities. For example, the profile information may indicate a typical gait or walking speed for a user. In another example, the profile information may indicate a typical orientation or pose in which the user holds his or her user device. In yet another example, the profile information may indicate a rate of keystrokes or other suitable usage metrics for the user device.

In embodiments, the profile identification module 110 may be configured to compare the profile information to usage data collected over a recent period of time. For example, the profile identification module 110 may compare usage information obtained for the user device within the last five minutes to information from a number of profiles in order to identify which profile is likely associated with the current operator of the user device. In this example, the profile identification module 110 may be configured to determine a similarity between the obtained usage information and one or more profile. In some embodiments, this may comprise providing the obtained usage information and/or profile information to a machine learning model that has been trained to correlate usage data to particular user profiles. In some embodiments, the profile identification module 110 may be called by one or more of the mobile applications 112 to determine an identity of a current user.

In some embodiments, the profile identification module 110 may be configured to provide an indication of a likelihood value that a current user of the user device is associated with a user profile to an application or website that calls upon the profile identification module 110. In some embodiments, the profile identification module 110 may be configured to restrict access to one or more applications or websites based on a likelihood value that a current user of the user device is associated with a user profile. For example, user preferences for a user may be used to determine what applications/websites may be accessed by the user device and under what conditions (e.g., a threshold likelihood value of being a particular user). In some cases, the profile identification module 110 may, upon receiving a request to access a website, determine whether to retrieve and provide a session token associated with that website. For example, if the likelihood value that a current user of the user device is greater than a predetermined threshold, then the session token for the website may be returned. Alternatively, if the likelihood value that a current user of the user device is less than a predetermined threshold, then the session token for the website may not be returned. This may have the effect of causing the website to require login.

A service provider computer 108 is any computing device that may participate in a network and hosts a service accessible by the user device 104. The network may be, without limitation, a local area network (LAN), a virtual private network (VPN), a communication network, or the Internet. The service provider computer 108 is analogous to the user device 104. Specifically, it will include a processor 218, a memory 220, an input/output interface 222 and/or a network interface 224. The memory 220 may include at least an operating system 226 and a module for managing profile information distributed between user devices (e.g., profile management module 126). In some embodiments, the service provider 108 may have access to a data store 230 that includes one or more database tables. For example, the data store 230 may include a database of profile data 124 that comprises information about user usage patterns (e.g., profile data 124) as well as a database of user preference data 232 that includes information on preferences of a number of users. A service provider computer 108 may play the role of an EIT server. Alternatively, the service provider computer 108 is a server on the Internet.

The profile management module 126 may be configured to, in conjunction with the processor 218, provide profile information to one or more user devices associated with, or operated by, a user. In some embodiments, user devices may be associated with a user by virtue of the user accessing a common account via those user devices. In some embodiments, profile information may be obtained from one or more user devices associated with a particular user and then aggregated in profile data 124. The profile information for a user that is included in profile data 124 may be distributed to each of the user devices associated with that user as that profile information is updated.

In some embodiments, the services of a service provider computer 108 may be provided via a cloud platform. Accordingly, a service provider computer 108 may either be a physical dedicated server or a virtual machine. In the latter case, the cloud platform may represent a plurality of disaggregated servers which provide virtual application server functionality and virtual storage/database functionality. The disaggregated servers are physical computer servers, which may each have a processor, a memory, an I/O interface and/or a network interface. The features and variations of the processor, the memory, the I/O interface and the network interface are substantially analogous to those described for service provider computer. Differences may be where the disaggregated servers are configured to satisfy different objectives or balance competing objectives in different ways. For example, disaggregated servers can be optimized for throughput and/or for disaggregation.

Cloud platform services may be made accessible via an integrated cloud infrastructure. Such a cloud infrastructure not only provides access to cloud services, but also to billing services and other monetization services. A cloud infrastructure may provide additional service abstractions such as Platform as a Service (PAAS), Infrastructure as a Service (IAAS), and Software as a Service (SAAS).

Figure 3:
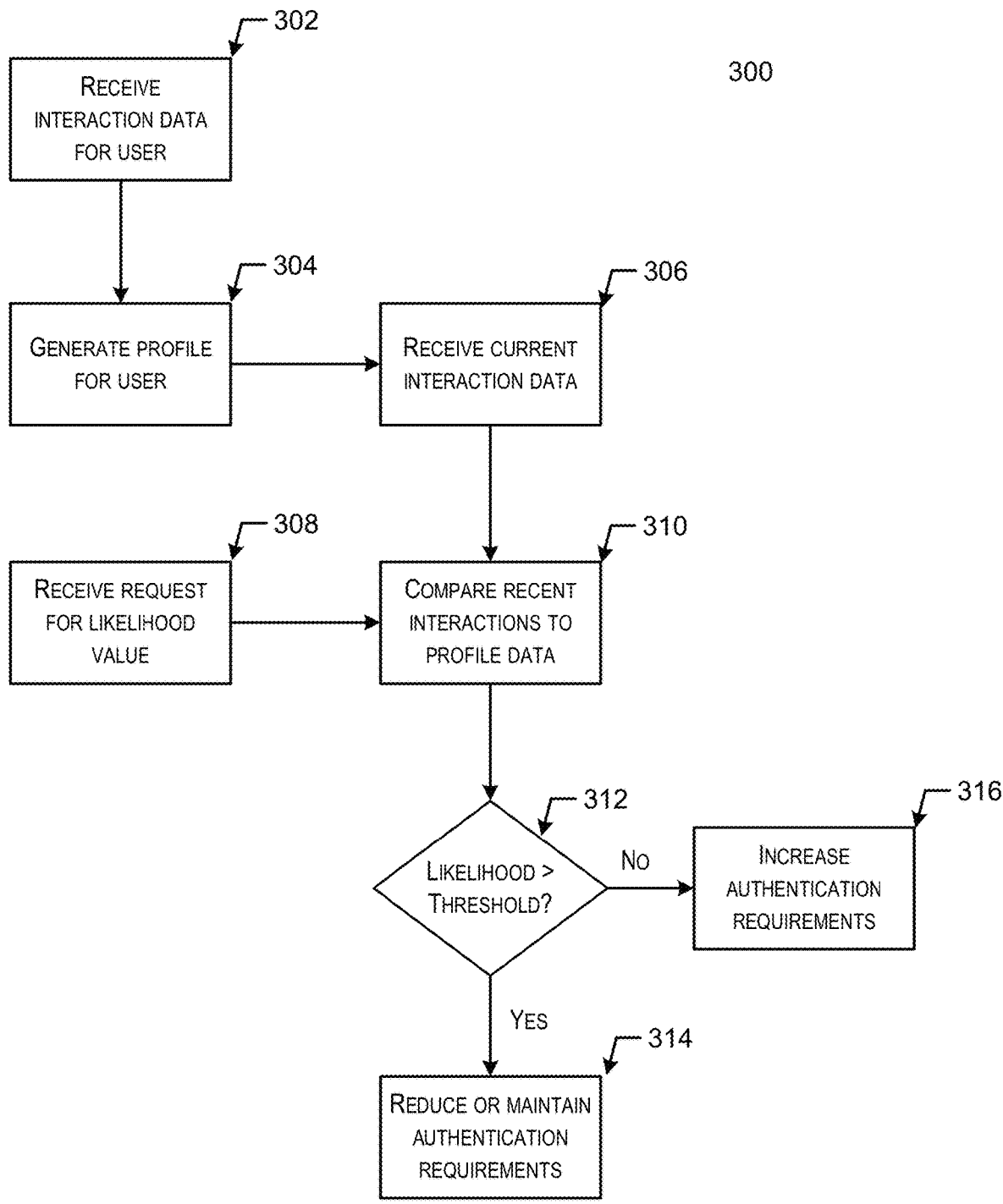
FIG. 3 depicts a flow diagram illustrating an exemplary process for providing user profile identification determinations based on user interaction data in accordance with embodiments.

FIG. 3 depicts a flow diagram illustrating an exemplary process for providing user profile identification determinations based on user interaction data in accordance with embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the exemplary process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by one or more computing devices as shown in FIG. 1. For example, the process 300 may be performed by a user device 104 or by a service provider computer 108 as described with respect to FIG. 1. The code may be stored on a computer-readable storage medium, for example, in the form of a computer program including a plurality of instructions executable by one or more processors. The computer-readable storage medium may be non-transitory.

At block 302, the process 300 involves receiving interaction data for a user. Interaction data may include any data collected in relation to an event occurring during which the user is in possession of the user device. The interaction data may include an indication of any way in which a user interacts with a user device. For example, interaction data may include sensor data collected from one or more sensors installed within the user device (e.g., accelerometers and/or gyroscopes) while the user walks or otherwise interacts with the user device. In this example, the interaction data may be used to determine an angle at which the user typically holds the user device and/or a gait at which the user walks. In another example, the interaction data may be used to determine a speed at which the user types, a way in which the user browses information, types of content interacted with by the user, or any other suitable user behavior pattern.

At block 304, the process 300 involves generating a profile for the user based on the received interaction data. To do this, determinations made based on various interaction data collected about the user may be compiled and stored in relation to the user. In some embodiments, a user profile may include only determinations made based on recent interaction data collected about the user (e.g., interaction data collected within the last 30 days), such that determinations of user behavior may change over time. The user profile may include determinations made about the user's interactions with a variety of different types of user device. For example, the user profile may include determinations about the user's interactions with his or her laptop device as well as determinations about the user's interactions with his or her mobile device. The determinations about the user's interactions with his or her laptop device may be separate from the determinations about the user's interactions with his or her mobile device.

In some embodiments, a user profile may be pushed out to a number of user devices. For example, user profile data for a single user on a user device may be provided to the service provider computer. Such profile data for the single user may be collected from a number of user devices and aggregated into a master profile stored by the service provider. In some embodiments, the service provider computer may then transmit the master profile for the user to a number of user devices determined to be associated with the user.

At block 306, the process 300 involves receiving current interaction data from a user device. For the purposes of this disclosure, current interaction data may refer to data collected about interactions between the user and the user device within some immediately preceding period of time (e.g., within the last 30 minutes). In some embodiments, the process 300 may comprise constantly monitoring for current user interaction data. For example, in embodiments in which the process 300 is performed by a profile identification module on a user device, such a profile identification module may constantly collect interaction data from various sensors installed upon the user device (e.g., as a background application).

At block 308, the process 300 may involve receiving a request for a likelihood value. Such a request may be received from a software application or electronic device that is separate from the profile identification module of the user device. For example, the request may be received by a profile identification module from a separate software application running on the user device that seeks to authenticate a user of the user device. In another example, the request may be received by a profile identification module on a user device from another electronic device that requires authentication of a user.

At block 310, the process 300 involves determining a likelihood value that a current user of the user device is a user associated with the profile generated at block 304. This comprises comparing determinations made based on current (e.g., recent) user interaction data to determinations made based on interaction data stored in the profile data for the user. The process may comprises determining a likelihood value as a degree to which the determinations made based on current user interaction data to determinations made based on interaction data stored in the profile data for the user.

In some embodiments, the process 300 may involve determining a likelihood value for each of a number of user profiles. For example, the user device may be used on separate occasions by each of three different users. In this example, a different user profile may be stored for each of the three different users. At block 310, the process 300 may involve determining which, if any, of the three different users are currently using the user device based on the current interaction data. In some embodiments, this may involve generating a likelihood value for each user and then determining the user with the highest likelihood value.

At block 312, process 300 involves comparing the determined likelihood value to some predetermined threshold. In some embodiments, the predetermined threshold value may be a threshold value maintained by the profile identification module. In some embodiments, the predetermined threshold value may be maintained by an entity from which the request was received. For example, the request may be received from a software application that has requested the likelihood value from the profile identification module. In some embodiments, a number of different threshold values may be maintained.

Upon determining that the determined likelihood value is greater than or equal to a threshold value ("yes" from the decision block 312), the process 300 comprises reducing or at least maintaining a current level of authentication for the user. In this example, the process may return to 306 to continue to monitor for current interaction data.

Upon determining that the determined likelihood value is less than a threshold value ("no" from the decision block 312), the process 300 comprises increasing a current level of authentication for the user. In some embodiments, this may involve adding additional authentication steps to a current authentication process. For example, an authentication process that typically requires a user to provide login credentials (e.g., user name and password) may be supplemented such that the user is further required to answer one or more security questions stored in relation to the user. In some embodiments, a likelihood value for the user may be updated dynamically and upon determining that a likelihood value is less than some threshold, the authenticating entity may log the user out of an account associated with the user. In some embodiments, the authenticating entity may require a new authentication to remain logged into the account.

Figure 4:
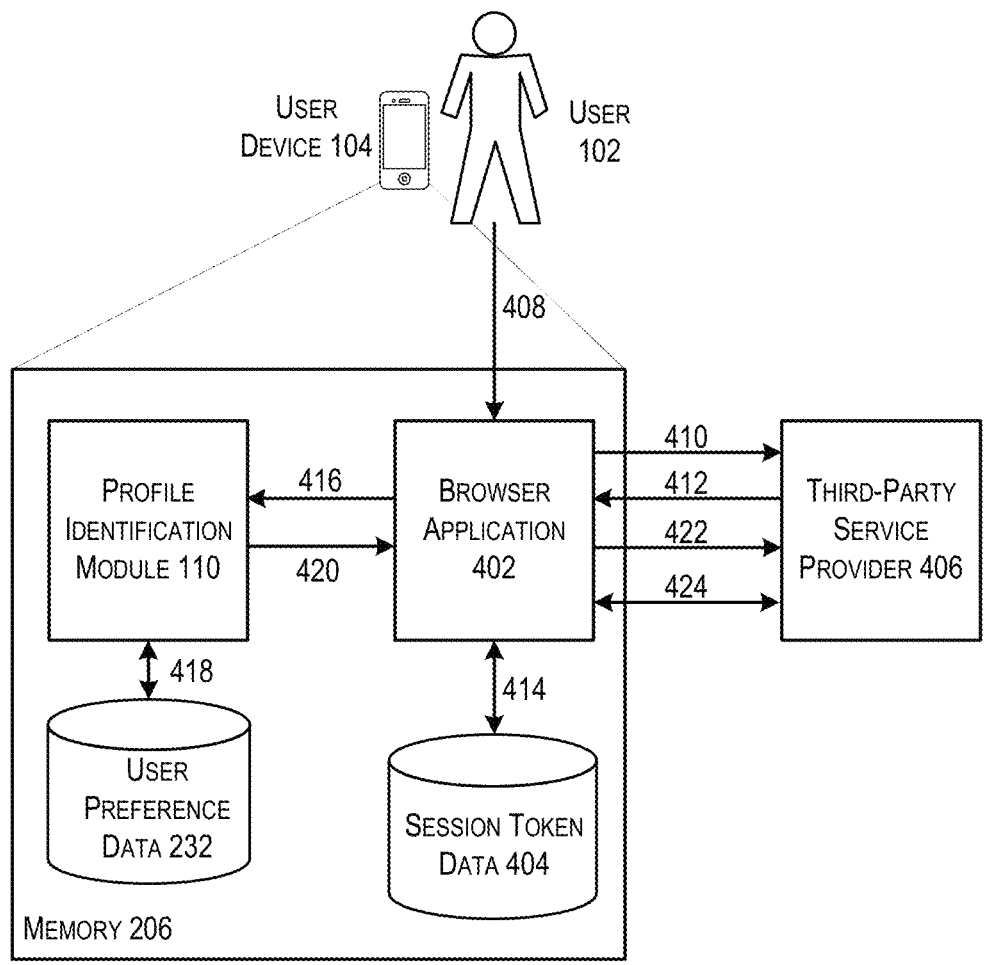
FIG. 4 depicts a number of exemplary interactions that may occur between implemented components that include a profile identification module in accordance with embodiments.

FIG. 4 depicts a number of exemplary interactions that may occur between implemented components that include a profile identification module in accordance with embodiments. In embodiments, a user device 104 may include (within a memory 206) a profile identification module 110 as described with respect to FIG. 2 above. Additionally, the memory may further include a browser application 402 and a data store of session token data 404. The user device may be used to interact with at least one third-party service provider 406.

A browser application 402 may be any suitable software application configured to provide a user 102 with access to websites operated by, or maintained on behalf of, one or more third-party service providers. For example, a browser application may be a web browser that enables a user device to access webpages hosted by a third-party service provider.

A third-party service provider 406 may be any provider of a service that is unaffiliated with the profile identification module as described herein. In some embodiments, a third-party service provider may be an operator of a service provided via an Internet website. Each third-party service provider may maintain information related to an account for a user. In order to access that information, and/or functionality associated with the service, the user may be required to log into that account via an authentication process. Some third-party service providers use session tokens in order to provide convenience to customers. A session token is any suitable piece of data that is stored on a user device and used in network communications to identify a series of related message exchanges (i.e., a session). In some embodiments, a session token for a service stores an authentication status so that a user who is authenticated once will not need to be re-authenticated each time that she or he uses the service. A user device may provide a session token to a third-party service provider in order to access an account/service provided by that third-party service provider without requiring the user to log in or otherwise be authenticated. Session tokens can be active for preconfigured period of times, such as a number of years, but typically expire every two years, before becoming expired and unusable for authentication purposes.

By way of illustrating interactions that may occur between implemented components, consider the following scenario, which is described as a sequence of operations that can be implemented in hardware, software, or a combination thereof. At 408, a request may be received via the browser application to access a service provided by particular third-party service provider. For example, the user may request to access a website operated by the third-party service provider. The browser application may then cause the user device to retrieve a website maintained by the third-party service provider at 410. In some embodiments, the user device may attempt to log into an account maintained by the third-party service provider.

Upon receiving a request from a user device for access to a service, an access control application of the third-party service provider may request a current session token from the browser application at 412. Upon receiving such a request, the browser application may determine whether such a session token exists, and if so, retrieve that session token from a data store of session token data 404 at 414. If no such session token is stored on the user device, then the browser application may return an indication that there is no session token and the user may be asked to provide login credentials to access the service. If, however, a session token is retrieved at 414, the browser application may be configured to submit a request to the profile identification module at 416. Such a request may include at least an identifier for the third-party service provider.

Upon receiving a request from a browser application, the profile identification module may determine a likelihood value that the current user of the user device matches a user profile. In some embodiments, this may comprise comparing interaction data collected by the user device to information stored in one or more user profiles to determine a degree to which the information matches. In some embodiments, one or more of the current usage data and the user profile information may be provided to a machine learning model that has been trained to determine a degree to which the two match.

The profile identification module may access user preference data at 418 to identify an appropriate access policy. In some embodiments, the user preference data may include an indication of conditions (e.g., a threshold likelihood value) under which access to third-party services (either specific or general) should be allowed without additional authentication. For example, the user preference data may indicate a likelihood value threshold that, if a current determined likelihood value is greater than, a session token should be returned for a particular website/service, therefore preventing the need to provide login credentials. In some cases, the user preference data may include an indication of particular likelihood values to be applied with respect to particular third-party service providers. For example, the user preference data may indicate a specific threshold in relation to a specified website or service. In some cases, the user preference data may indicate a default threshold value to be applied to any unspecified website or service.

Upon retrieving user preference data that indicates a threshold associated with the identified third-party service provider, the profile identification module 110 may compare the determined likelihood value to that threshold to determine if the likelihood value is greater than that threshold. Upon making a determination as to whether the determined likelihood value is greater than the relevant threshold, the profile identification module may be configured to return an indication as to whether or not additional authentication should be required of the user at 420. If the determined likelihood value is greater than the relevant threshold, then a determination is made that no additional authentication is required. If, however, the determined likelihood value is less than the relevant threshold, then a determination is made that additional authentication should be required.

Upon receiving the indication from the profile identification module at 420, the browser application may be configured to make a determination as to whether to provide a session token to the third-party service provider. Upon determining that no additional authentication should be required, the browser application may be configured to provide the session token to the access control application of the third-party service provider at 422. Otherwise, the browser application may be configured to indicate to the access control application of the third-party service provider that no session token is available at 422.

Upon receiving a session token, the access control application of the third-party service provider may provide access to a service provided by the third-party service provider using credentials included in the session token. If the third-party service provider is not provided a session token, then the access control application of the third-party service provider may require reauthentication from the user device at 424. In some embodiments, this may comprise providing a login page to the browser application and receiving login credentials entered by a user.

In this manner, a user may be provided the ability to control under what circumstances a user device can be used to gain access to services without requiring authentication credentials. Embodiments as described herein make this possible even without active participation on behalf of the third-party service provider.

Figure 5:
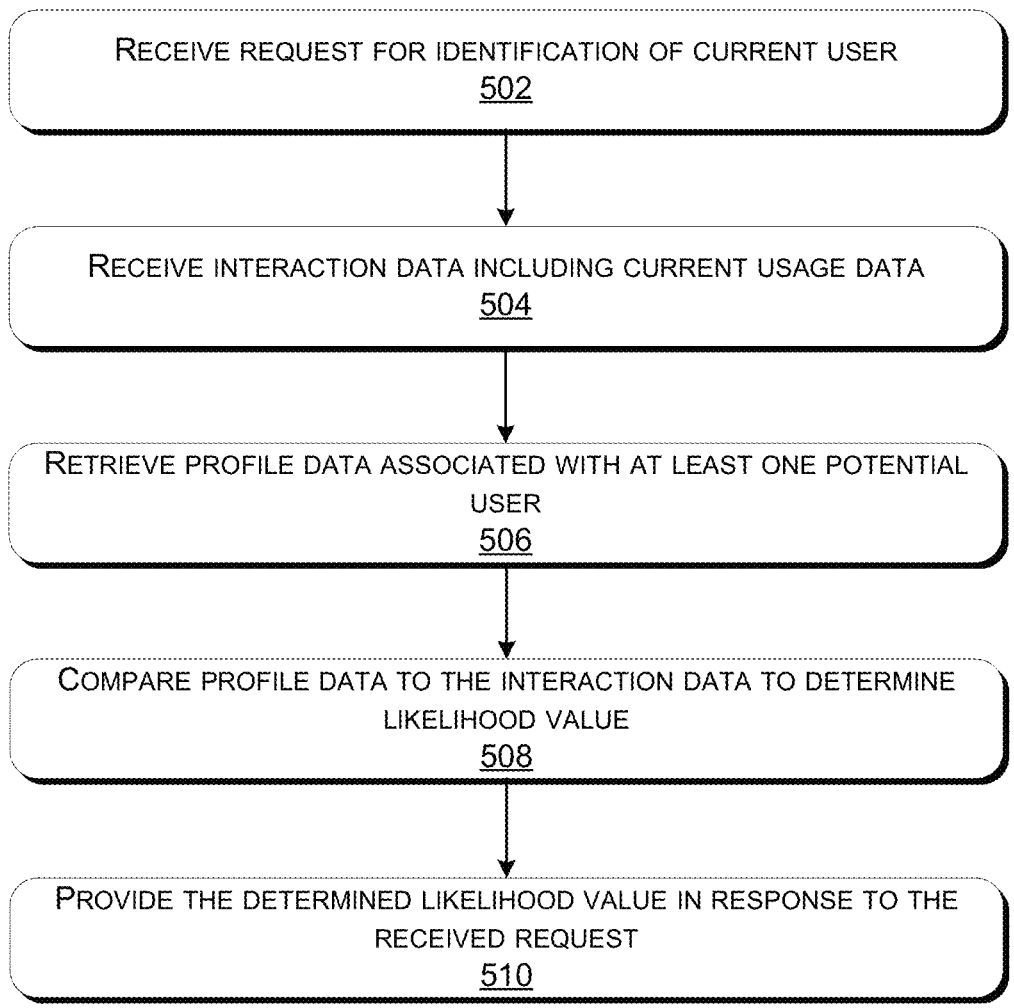
FIG. 5 depicts a flow diagram showing an example process flow for providing identification data in response to a request in accordance with embodiments.

FIG. 5 depicts a flow diagram showing an example process flow for providing identification data in response to a request in accordance with embodiments. The process 500 may be performed by a module or other component implemented within a user device. For example, the process 500 may be performed by a profile identification module 110 as described herein. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process.

At 502, the process 500 comprises receiving a request for identification of a current user of the user device. In some embodiments, such a request may be received from a third-party service provider, such as a third-party application installed on the user device or a website operated by a third party.

At 504, the process 500 comprises receiving interaction data that includes current usage data for the user device. In some embodiments, the information about current usage patterns for the user device comprises sensor data collected from one or more sensors installed within the user device. Such sensor data may comprise data collected from at least one of an accelerometer or gyroscope. In some embodiments, the current usage patterns for the user device comprise information received within a predetermined amount of time. For example, the current usage patterns may comprise information about interactions between a user and the user device received within the last five minutes.

At 506, the process 500 comprises retrieving profile data associated with at least one potential user. In some embodiments, the profile data comprises information about typical interactions between the potential user and the user device. For example, the profile data may include an indication of a manner (e.g., an angle or pose) in which a user typically holds a user device. In another example, the profile data may include an indication of a gait or walking speed that a user typically maintains. In another example, the profile data may include an indication of a typing speed or other keystroke information for the user. Profile data for a user may be compiled from usage data received from a number of user devices associated with that user.

At 508, the process 500 comprises comparing profile data to the interaction data to determine a likelihood value with respect to the profile data. In some embodiments, comparing the profile data to the information about current usage patterns comprises providing the profile data and information about current usage patterns to a machine learning model trained to determine similarities between profile data and usage patterns. In some embodiments, the likelihood value comprises a percentage probability that the potential user is a user associated with the profile data.

At 510, the process 500 comprises providing the determined likelihood value in response to the received request. In some embodiments, the process further comprises making a determination as to whether the determined likelihood value is greater than a predetermined threshold. In some embodiments, the process further comprises requiring additional authentication upon determining that the determined likelihood value is less than the predetermined threshold. In some embodiments, the request is received from a browser application executed upon the user device and the likelihood value is used to determine whether to provide a session token to a website accessed via the browser application.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
receiving, from an application that is accessible via a user device, a request for identification of a current user of the user device;
receiving interaction data that includes information about one or more current usage pattern for the user device;
retrieving profile data associated with at least one potential user of the user device;
comparing the profile data to the information about the one or more current usage patterns to determine, for the at least one potential user of the user device, a likelihood value that the at least one potential user is the current user of the user device;
comparing the likelihood value to a predetermined threshold;
based on comparing the likelihood value to the predetermined threshold, determining that the likelihood value satisfies the predetermined threshold;
based on determining that the likelihood value satisfies the predetermined threshold, generating an instruction to maintain a current level of authentication used by the application to authenticate the current user;
providing, for output to the application that is accessible via the user device, the instruction to maintain the current level of authentication for the current user in response to the received request;
after the application that is accessible via the user device has authenticated the current user according to the current level of authentication, receiving additional interaction data that includes additional information about one or more additional current usage pattern for the user device;
comparing the profile data to the additional information about the one or more additional current usage patterns to determine, an additional likelihood value that the current user remains an actual user of the user device;
comparing the additional likelihood value to an additional predetermined threshold;
based on comparing the additional likelihood value to the predetermined threshold, determining that the additional likelihood value does not satisfy the additional predetermined threshold;
based on determining that the additional likelihood value does not satisfy the additional predetermined threshold, generating an instruction to log the current user out of the application that is accessible via the user device; and
providing, for output to the application that is accessible via the user device, the instructions to log the current user out of the application that is accessible via the user device.

2. The method of claim 1, wherein the one or more current usage patterns for the user device comprise information received within a predetermined amount of time.

3. The method of claim 1, wherein the application that is accessible via the user device is associated with a third-party service provider.

4. The method of claim 1, comprising:
receiving other interaction data that includes other information about one or more other current usage patterns for an external sensor device, wherein comparing the profile data to the information about the one or more current usage patterns comprises comparing the profile data to (i) the information about the one or more current usage patterns and (ii) the other information about the one or more other current usage patterns.

5. The method of claim 1, wherein the information about the one or more current usage patterns for the user device comprises sensor data collected from one or more sensors installed within the user device.

6. The method of claim 5, wherein the sensor data comprises data collected from at least one of an accelerometer or a gyroscope.

7. A computing device comprising:
a processor; and
a memory including instructions that, when executed with the processor, cause the computing device to, at least:
receive, from an application that is accessible via a user device, a request for identification of a current user of the user device;
receive interaction data that includes information about one or more current usage pattern for the user device;
retrieve profile data associated with at least one potential user of the user device;
compare the profile data to the information about the one or more current usage patterns to determine for the at least one potential user of the user device, a likelihood value that the at least one potential user is the current user of the user device;
compare the likelihood value to a predetermined threshold;
based on comparing the likelihood value to the predetermined threshold, determine that the likelihood value satisfies the predetermined threshold;
based on determining that the likelihood value satisfies the predetermined threshold, generate an instruction to maintain a current level of authentication used by the application to authenticate the current user;
provide, for output to the application that is accessible via the user device, the instruction to maintain the current level of authentication for the current user in response to the received request
after the application that is accessible via the user device has authenticated the current user according to the current level of authentication, receive additional interaction data that includes additional information about one or more additional current usage pattern for the user device;
compare the profile data to the additional information about the one or more additional current usage patterns to determine, an additional likelihood value that the current user remains an actual user of the user device;
compare the additional likelihood value to an additional predetermined threshold;
based on comparing the additional likelihood value to the predetermined threshold, determine that the additional likelihood value does not satisfy the additional predetermined threshold;
based on determining that the additional likelihood value does not satisfy the additional predetermined threshold, generate an instruction to log the current user out of the application that is accessible via the user device; and
provide, for output to the application that is accessible via the user device, the instructions to log the current user out of the application that is accessible via the user device.

8. The computing device of claim 7, wherein comparing the profile data to the information about current usage patterns comprises providing the profile data and information about current usage patterns to a machine learning model trained to determine similarities between given profile data and given usage patterns.

9. The computing device of claim 7, wherein the request is received from a browser application executed upon the user device and the likelihood value is used to determine whether to provide a session token to a website accessed via the browser application.

10. The computing device of claim 7, wherein the likelihood value comprises a percentage probability that the potential user is a user associated with the profile data.

11. The computing device of claim 7, wherein the one or more current usage patterns for the user device comprise information received within a predetermined amount of time.

12. The computing device of claim 7, wherein the instructions further cause the computing device to determine whether the likelihood value is greater than the predetermined threshold.

13. The computing device of claim 7, wherein the information about the one or more current usage patterns for the user device comprises sensor data collected from one or more sensors installed within the user device.

14. The computing device of claim 13, wherein the sensor data comprises data collected from at least one of an accelerometer or a gyroscope.

15. The computing device of claim 7, wherein the profile data comprises aggregated information about typical interactions between the potential user and the user device.

16. The computing device of claim 15, wherein the profile data comprises information about a manner in which the potential user typically holds the user device, a gait or walking speed that the user typically maintains, or keystroke information.

17. A non-transitory computer-readable media collectively storing computer-executable instructions that upon execution cause one or more computing devices to collectively perform acts comprising:
receiving, from an application that is accessible via a user device, a request for identification of a current user of the user device;
receiving interaction data that includes information about one or more current usage pattern for the user device;
retrieving profile data associated with at least one potential user of the user device;
comparing the profile data to the information about the one or more current usage patterns to determine for the at least one potential user of the user device, a likelihood value that the at least one potential user is the current user of the user device;
comparing the likelihood value to a predetermined threshold;
based on comparing the likelihood value to the predetermined threshold, determining that the likelihood value satisfies the predetermined threshold;
based on determining that the likelihood value satisfies the predetermined threshold, generating an instruction to maintain a current level of authentication used by the application to authenticate the current user;

providing, for output to the application that is accessible via the user device, the instruction to maintain the current level of authentication for the current user in response to the received request;

after the application that is accessible via the user device has authenticated the current user according to the current level of authentication, receiving additional interaction data that includes additional information about one or more additional current usage pattern for the user device;

comparing the profile data to the additional information about the one or more additional current usage patterns to determine, an additional likelihood value that the current user remains an actual user of the user device;

comparing the additional likelihood value to an additional predetermined threshold;

based on comparing the additional likelihood value to the predetermined threshold, determining that the additional likelihood value does not satisfy the additional predetermined threshold;

based on determining that the additional likelihood value does not satisfy the additional predetermined threshold, generating an instruction to log the current user out of the application that is accessible via the user device; and providing, for output to the application that is accessible via the user device, the instructions to log the current user out of the application that is accessible via the user device.

18. The computer-readable media of claim 17, wherein the information about the one or more current usage patterns for the user device comprises sensor data collected from one or more sensors installed within the user device.

19. The computer-readable media of claim 18, wherein the sensor data comprises data collected from at least one of an accelerometer or a gyroscope.

\* \* \* \* \*